(12) United States Patent
Collins et al.

(10) Patent No.: US 8,328,150 B2
(45) Date of Patent: Dec. 11, 2012

(54) MOUNTING PLATE AND COVER ASSEMBLY FOR ELECTRICAL DEVICES

(75) Inventors: Paul Donald Collins, Mechanicsville, VA (US); John Gerald King, Camillus, NY (US)

(73) Assignee: Cooper Technologies Company, Houston, TX (US)

( * ) Notice: Subject to any disclaimer, the term of this patent is extended or adjusted under 35 U.S.C. 154(b) by 179 days.

(21) Appl. No.: 12/114,328

(22) Filed: May 2, 2008

(65) Prior Publication Data

US 2009/0272572 A1    Nov. 5, 2009

(51) Int. Cl.
*A47F 5/08* (2006.01)
*H02G 3/08* (2006.01)

(52) U.S. Cl. ............ 248/205.1; 248/27.1; 248/300; 248/906; 220/3.9; 174/58

(58) Field of Classification Search .......... 248/205.1, 248/906, 27.1, 300; 220/3.6, 3.3, 3.9, 3.92; 174/58, 63, 502, 503, 57
See application file for complete search history.

(56) References Cited

U.S. PATENT DOCUMENTS

| | | | | |
|---|---|---|---|---|
| 1,206,431 A * | 11/1916 | Graybill | | 220/3.4 |
| 4,572,391 A * | 2/1986 | Medlin | | 220/3.9 |
| 4,603,789 A * | 8/1986 | Medlin, Sr. | | 220/3.9 |
| 4,688,693 A * | 8/1987 | Medlin, Jr. | | 220/3.9 |
| 4,964,525 A * | 10/1990 | Coffey et al. | | 220/3.9 |
| 5,595,362 A * | 1/1997 | Rinderer et al. | | 248/27.1 |
| 5,965,844 A * | 10/1999 | Lippa | | 174/481 |
| 6,188,022 B1 * | 2/2001 | He | | 174/58 |
| 7,053,300 B2 * | 5/2006 | Denier et al. | | 174/58 |

* cited by examiner

*Primary Examiner* — Anita M King
(74) *Attorney, Agent, or Firm* — King & Spalding LLP

(57) ABSTRACT

Combination mounting plate and cover assemblies for mounting an electrical outlet box on one side of a stud in a wall are provided. The mounting plate and cover assemblies are configured to receive an additional bracket and/or outlet box on an opposite side of the stud. The combination mounting plate and cover assemblies can be single unitary members serving the multiple functions of a raised cover ring, a box support, and a secondary bracket/outlet box support. Systems including combination mounting plate and cover assemblies having an electrical box and a bracket or second outlet box attached thereto.

28 Claims, 8 Drawing Sheets

MOUNTING PLATE AND COVER ASSEMBLY FOR ELECTRICAL DEVICES

TECHNICAL FIELD

The invention relates generally to combination mounting plate and cover assemblies for mounting an electrical outlet box to a stud.

BACKGROUND

Outlet box mounting assemblies are used to secure an electrical outlet box to a stud in a wall. Typically, an electrical outlet box is attached to a mounting assembly that is further attached to a wall stud. However, certain conventional mounting assemblies do not firmly secure to the stud, and in turn, cause undesired deflection, or movement in the direction perpendicular to the wall, of the attached electrical outlet box upon force, such as from a plug being inserted into the outlet box. Accordingly, such mounting assemblies require an auxiliary member, such as a stiffening arm, to reduce undesired deflection of the outlet box when attached to the wall stud.

Additionally, most conventional mounting assemblies require two separate components: an outlet box support and a raised cover ring. The outlet box and mounting assembly components must be assembled and connected in sequence, which is labor intensive. While some existing combination mounting plate and cover assemblies having a reduced number of components are able to mount an outlet box on a stud such that some movement of the outlet box is prevented, these assemblies do not allow mounting of additional brackets or brackets and outlet boxes on the opposite side of the stud.

Therefore, a need exists in the art for an outlet box mounting assembly that can firmly secure to a stud, has a reduced number of components for assembly, accommodates a main electrical outlet box, and can accommodate mounting of an additional bracket and/or outlet box.

SUMMARY

The present invention can satisfy the above-described need by providing a combination mounting plate and cover assembly for mounting an electrical outlet box to a stud in a wall such that the electrical outlet box may substantially prevented from moving in any direction. The combination mounting plate and cover assembly also is configured to receive an additional bracket or outlet box on the opposite side of the stud. Generally, the combination mounting plate and cover assemblies of the present invention are single unitary members serving the multiple functions of a raised cover ring, a box support, and a secondary bracket/outlet box support.

According to one exemplary aspect, the combination mounting plate and cover assemblies of the present invention include a single unitary member having a first edge, a second edge, an open portion for receiving an electrical outlet box, and a planar portion extending laterally from the open portion to the second edge. The open portion is positioned closer to the first edge than to the second edge. Typically, a raised rib is formed about the circumference of the open portion. The combination mounting plate and cover assembly comprises multiple openings for securing an electrical outlet box to the single unitary member. The openings are positioned proximate the open portion, disposed between the open portion and the first edge and between the open portion and the second edge. The planar portion comprises holes for securing the single unitary member to a stud, as well as apertures for securing the single unitary member to a bracket or second electrical outlet box on a side of the stud opposite to the other electrical outlet box. The apertures are proximate the second edge, and the holes are positioned between the second edge and the open portion. In certain exemplary aspects, the assembly also may comprise a far side support extending orthogonal to the first edge. In some exemplary aspects, a leg may extend from the planar portion for additional support against a side wall of the stud. In some exemplary aspects, the planar portion may include a viewing window to find markings in the stud.

A system according to an exemplary aspect of the present invention comprises combination mounting plate and cover assemblies having an electrical outlet box secured thereto at the open portion proximate to the first edge of the assembly and having a bracket or second electrical outlet box secured thereto at the planar portion proximate to the second edge of the assembly. The system can be mounted to a stud in a wall via holes in the planar portion.

Combination mounting plate and cover assemblies of the present invention may reduce or eliminate undesired movement of the electrical outlet box and assembly while using a reduced number of components compared to conventional mounting assemblies. Combination assemblies according to the invention also can allow a user to mount a bracket or second outlet box to the assembly, which is not possible with conventional combination assemblies.

These and other aspects, objects, and features of the invention will become apparent to those having ordinary skill in the art upon consideration of the following detailed description of exemplary embodiments exemplifying the best mode for carrying out the invention as presently perceived.

DETAILED DESCRIPTION

Figure 1:
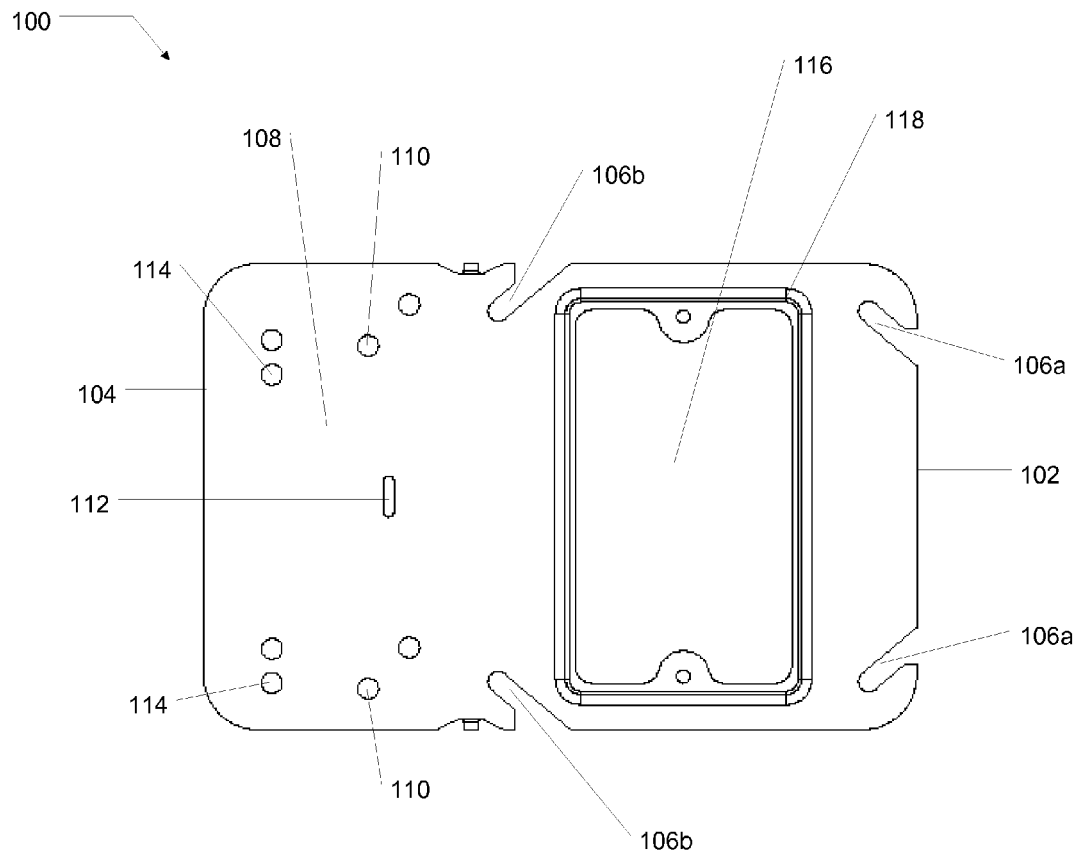
FIG. 1 is a front view of a combination mounting plate and cover assembly according to an exemplary embodiment.

The present invention may be better understood by reading the following description of non-limiting embodiments with reference to the attached drawings wherein like parts of each of the several figures are identified by the same reference characters.

Referring to FIG. 1, an exemplary combination mounting plate and cover assembly 100 is illustrated as a single unitary member. Assembly 100 may be fabricated from any suitably rigid material. In exemplary embodiments, suitable rigid materials include, but are not limited to, sheet metal and plastic. Assembly 100 may have a thickness equal to or greater than about ⅛ inch.

In certain embodiments, assembly 100 may be generally rectangular with a first side edge 102 and an opposite, second side edge 104. Multiple spaced-apart openings (or slots) 106a, 106b are included in assembly 100. Openings 106a, 106b may be elongated for adjustable connection of an electrical outlet box (such as a junction box or other suitable box) (not shown) to assembly 100. In certain exemplary embodiments, four openings may be included, two openings 106a being proximate first side edge 102 for connection to one side of the electrical outlet box and two openings 106b positioned on assembly 100 for connection to the opposite side of the electrical outlet box.

The portion of assembly 100 between openings 106b and the second side edge 104 is defined as a planar portion 108. Planar portion 108 comprises at least two spaced-apart holes 110 between second side edge 104 and openings 106b, wherein holes 110 are spaced a short distance from second side edge 104 for securing assembly 100 to a stud (not shown) with fasteners (not shown). In certain exemplary embodiments, a viewing window 112 may be included in planar portion 108 to easily find and view any markings made in the stud (not shown) to which assembly 100 is to be attached.

Planar portion 108 also comprises at least two spaced-apart apertures 114 between second side edge 104 and holes 110 for securing a bracket (not shown) and/or additional electrical box (not shown) on the side of the stud opposite to the openings 106a, 106b. The section extending from the second side edge 104 to about midway of the planar portion 108 and including the apertures 114 makes up a first portion of the assembly. The section extending from about midway of the planar portion 108 to the apertures 106 b and including holes 110 makes up a second portion of the assembly. The section between the first edge 102 and the openings 106 b makes up a third portion of the assembly 100.

Assembly 100 further comprises an open portion 116 therein. Open portion 116 is disposed closer to first side edge 102 than to second side edge 104 and is positioned between openings 106a, 106b. Generally, open portion 116 does not extend onto planar portion 108. A raised rib 118 is formed about the circumference of open portion 116 and extends outwardly from assembly 100. Rib 118 has a height that is generally approximately equal to the thickness of a wall (not shown) behind which assembly 100 is positioned. In certain exemplary embodiments, rib 118 is integrally formed with assembly 100. In alternative exemplary embodiments, rib 118 is a separate piece that is attached to the assembly 100.

Figure 2A:
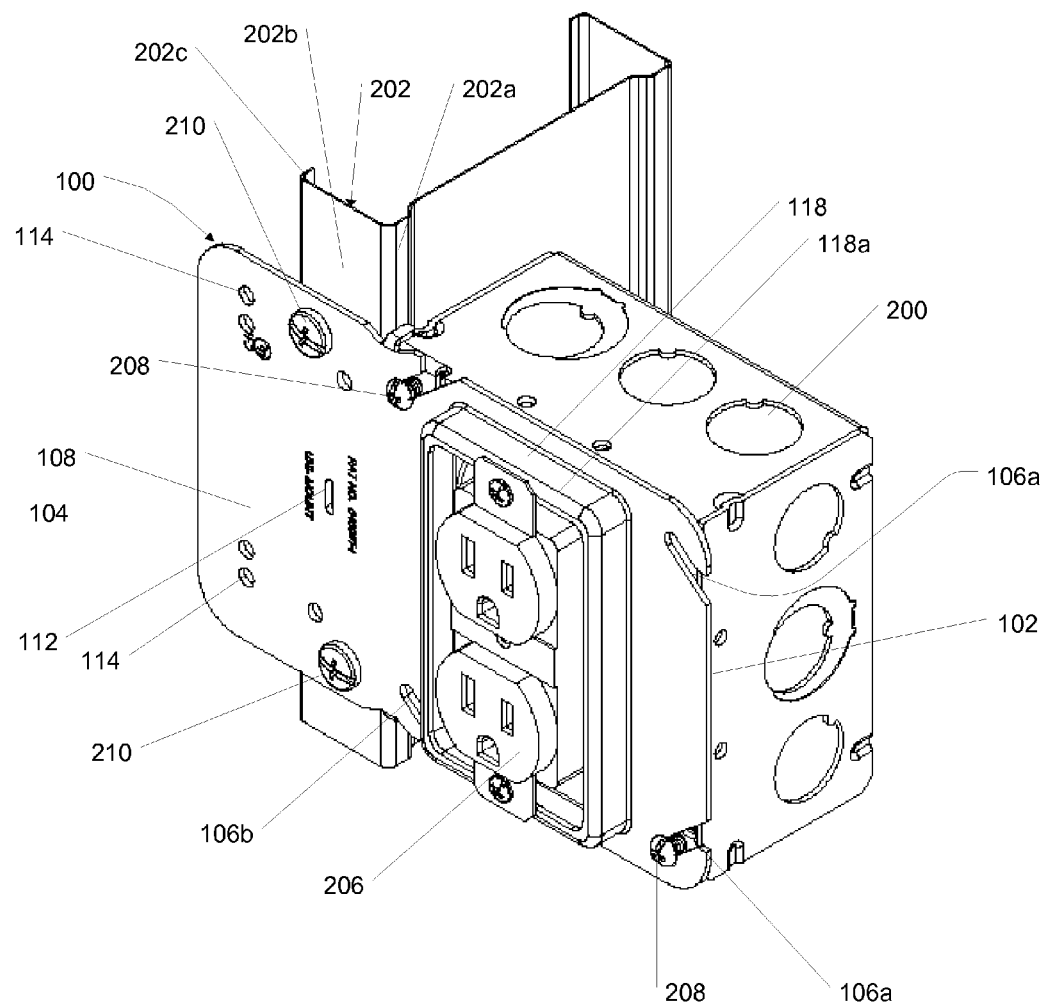
FIG. 2A is a perspective view of the combination mounting plate and cover assembly shown in FIG. 1 having an electrical outlet box connected thereto and adjacent a stud according to an exemplary embodiment.
Figure 2B:
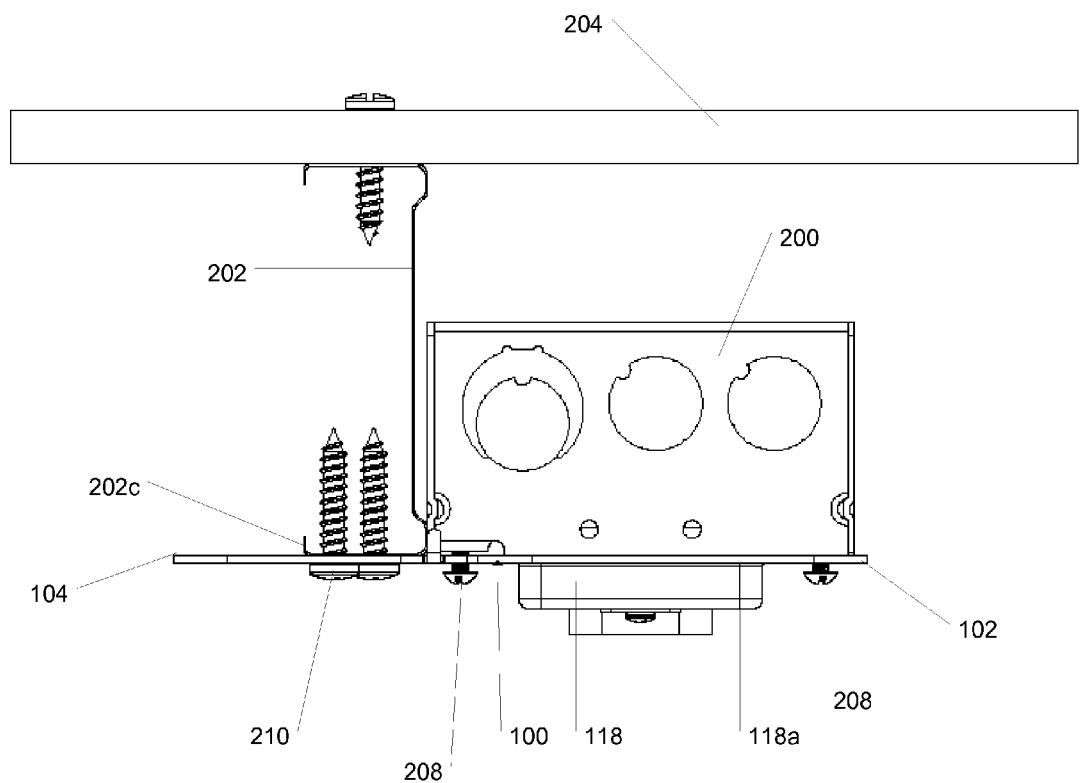
FIG. 2B is a side cross-sectional view of the combination mounting plate and cover assembly having an electrical outlet box connected thereto and adjacent a stud, as shown in FIG. 2A, with the stud further mounted to a wall, according to an exemplary embodiment.
Figure 2C:
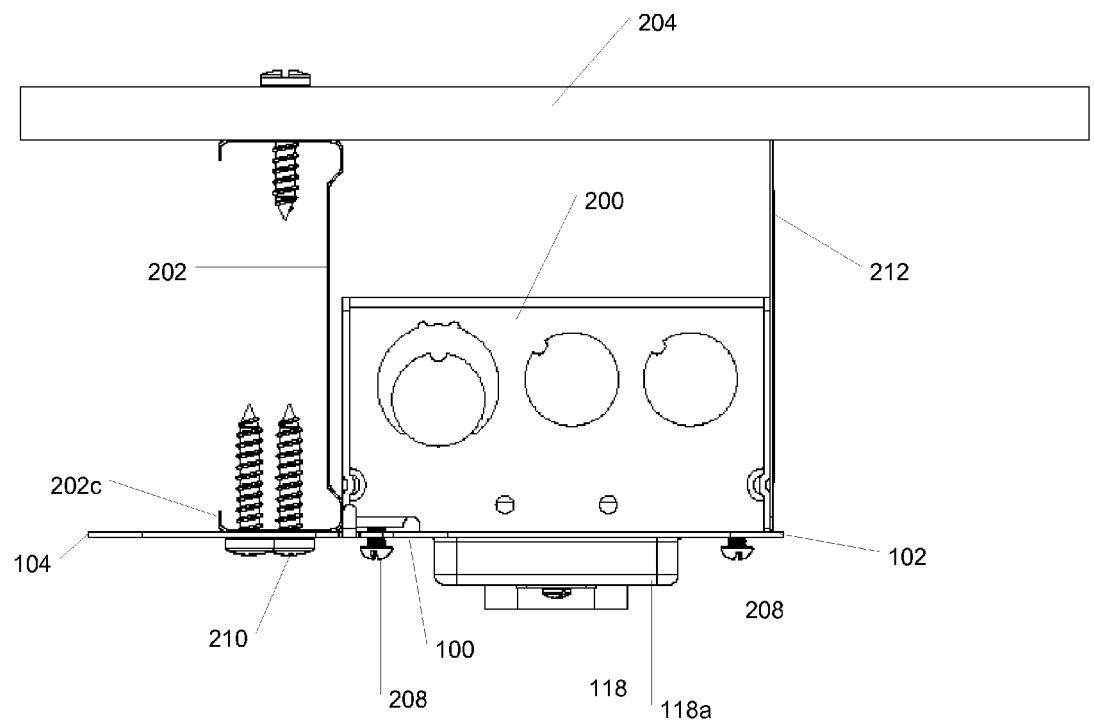
FIG. 2C is a perspective view of the combination mounting plate and cover assembly having an electrical outlet box connected thereto and adjacent a stud mounted to a wall, as shown in FIG. 2B, and having a far-side support, according to an exemplary embodiment.

Referring to FIGS. 2A-2C, an electrical outlet box 200 is attached to combination mounting plate and cover assembly 100, which is attached to a stud 202 having a wall 204 secured thereto. Electrical outlet box 200 can contain at least one electrical fixture 206 therein, such as a convenience outlet (as shown in FIG. 2A), an electrical switch, electrical terminals, or any other suitable device. Electrical outlet box 200 is connected to assembly 100 by multiple fasteners 208 received by openings 106a, 106b. Suitable examples of fasteners 208 include, but are not limited to, threaded screws, nuts and bolts, and other suitable fastening devices. Electrical outlet box 200 may be adjusted on assembly 100 by moving electrical outlet box 200 with respect to the elongated openings 106a, 106b.

Assembly 100 with the attached outlet box 200 is placed adjacent to stud 202 such that outlet box 200 contacts at least a portion of a side wall 202a of stud 202 and such that planar portion 108 is disposed against a front face 202b of stud 202 and extends beyond an opposite side wall 202c of stud 202. In some embodiments, electrical outlet box 200 may solidly abut side wall 202a of stud 202 and horizontal and angular movement of assembly 100 with respect to stud 202 may be substantially reduced or prevented. Further, any deflectional movement with respect to stud 202 may be limited. Fasteners 210 are disposed in holes 110 in planar portion 108 for securing assembly 100 to stud 202 such that movement of assembly 100 in any direction is substantially prevented. Fasteners 210 may be any common fastener. For instance, when stud 202 is wood, fasteners 210 may be a wood screw, nail, or other suitable fastener. When stud 202 is metal, fasteners 210 may be a self-tapping metal screw, rivet, nut and bolt, or other suitable fastener.

In certain exemplary embodiments, assembly 100 may further comprise a far-side support 212 (FIG. 2C) to further support assembly 100 such that assembly 100 does not deflect, or shift in a direction perpendicular to wall 204, when force is applied to assembly 100 or to a component attached thereto. Far-side support 212 is connected to first side edge 102 of assembly 100, and extends from assembly 100 to wall 204. In an exemplary embodiment, far side support 212 is integrally formed with the assembly 100.

Assembly 100 and outlet box 200 are covered by a wall (not shown) such that an opening in the wall receives raised rib 118 of assembly 100. A surface 118a of rib 118 is substantially flush with the outer surface of the wall due to the height of rib 118 being approximately the same as the thickness of the wall. Thus, electrical fixture 206 within the outlet box 200 may be readily accessible to a user.

Figure 3A:
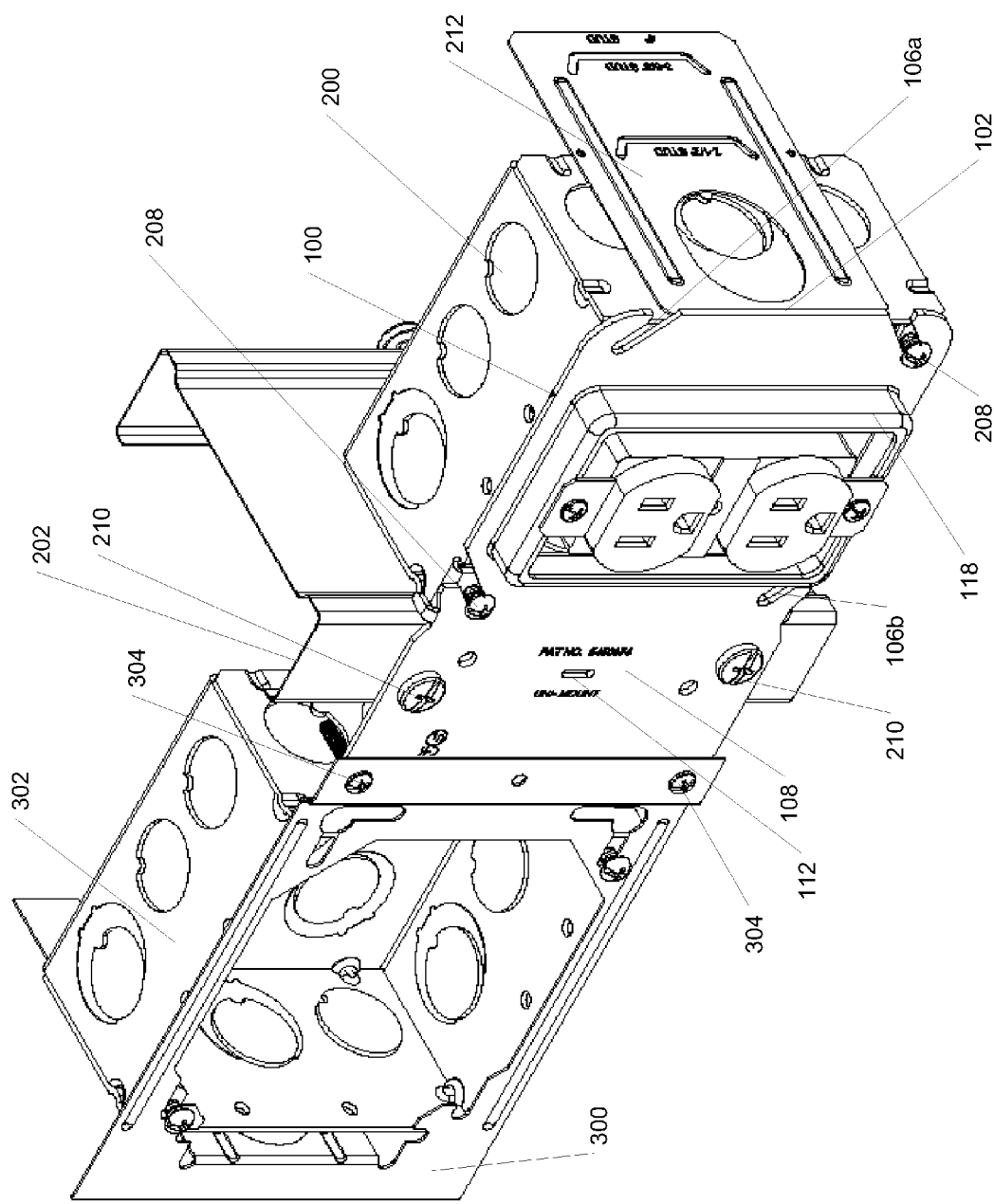
FIG. 3A is a perspective view of the combination mounting plate and cover assembly having an electrical outlet box connected thereto and adjacent a stud, as shown in FIG. 2A, and also having a bracket connected thereto on the opposite side of the stud, according to an exemplary embodiment.
Figure 3B:
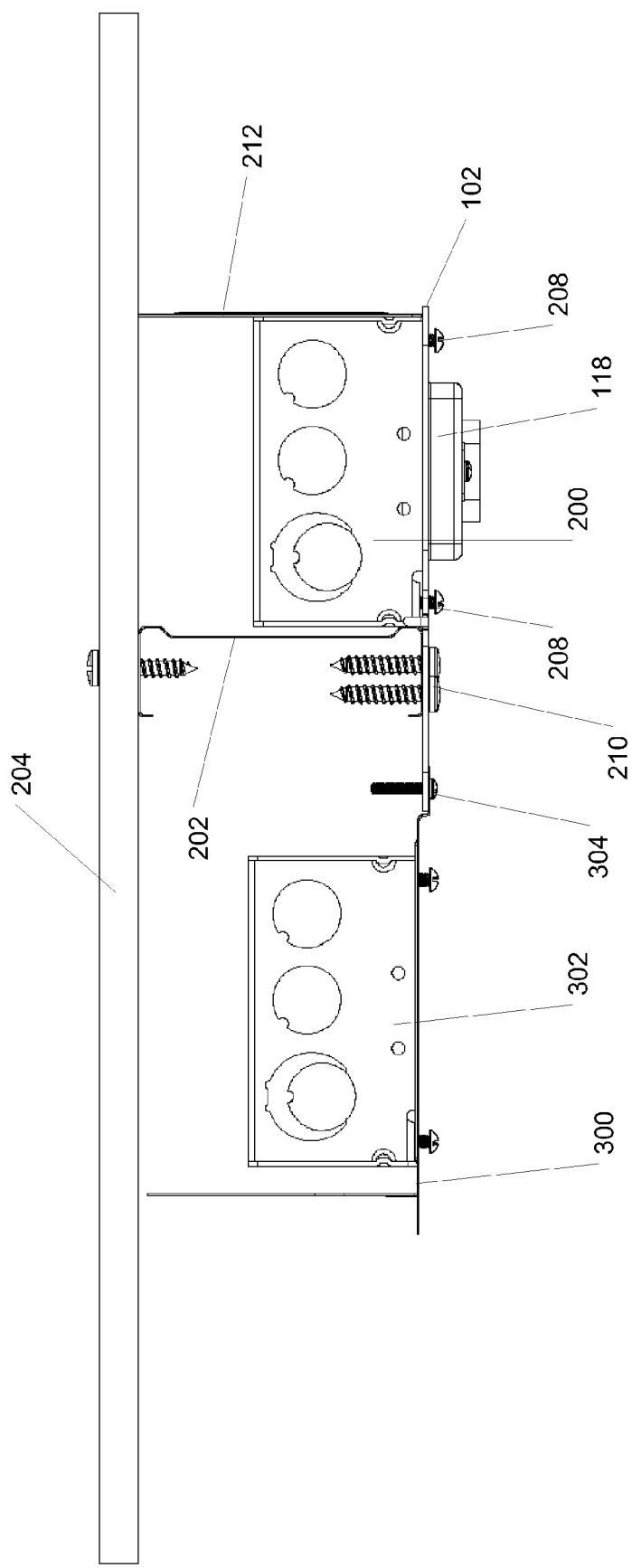
FIG. 3B is a side cross-sectional view of the combination mounting plate and cover assembly having an electrical outlet box connected thereto and adjacent a stud and also having a bracket connected thereto on the opposite side of the stud, as shown in FIG. 3A according to an exemplary embodiment.

Referring to FIGS. 3A-3B, a bracket 300 and an electrical outlet box 302 are attached to the combination mounting plate and cover assembly 100. In certain exemplary embodiments, electrical outlet box 302 is similar to electrical outlet box 200. Suitable examples of brackets 300 that may be attached to assembly 100 include, but are not limited to, box mounting brackets and box supports in product line BB4-23 commercially available from Cooper B-Line®, Inc. and Caddy® H23 mounting brackets commercially available from Erico International Corp. Bracket 300 and electrical outlet box 302 are secured to assembly 100, and assembly 100 is secured to stud 202 as shown in FIGS. 2A-2C.

Bracket 300 and electrical outlet box 302 are secured to assembly 100 on the side of stud 202 opposite to the electrical outlet box 200 using fasteners 304 through apertures 114. Suitable examples of fasteners 304 include, but are not limited to, threaded screws, nuts and bolts, and other suitable fastening devices. The configuration of assembly 100 allows for a bracket 300 and/or second electrical outlet box 302 to be attached to the side of stud 202 that is opposite to the electrical outlet box 200, and thus allows mounting of multiple devices to a single assembly and results in improved field flexibility and efficiency.

Figure 4A:
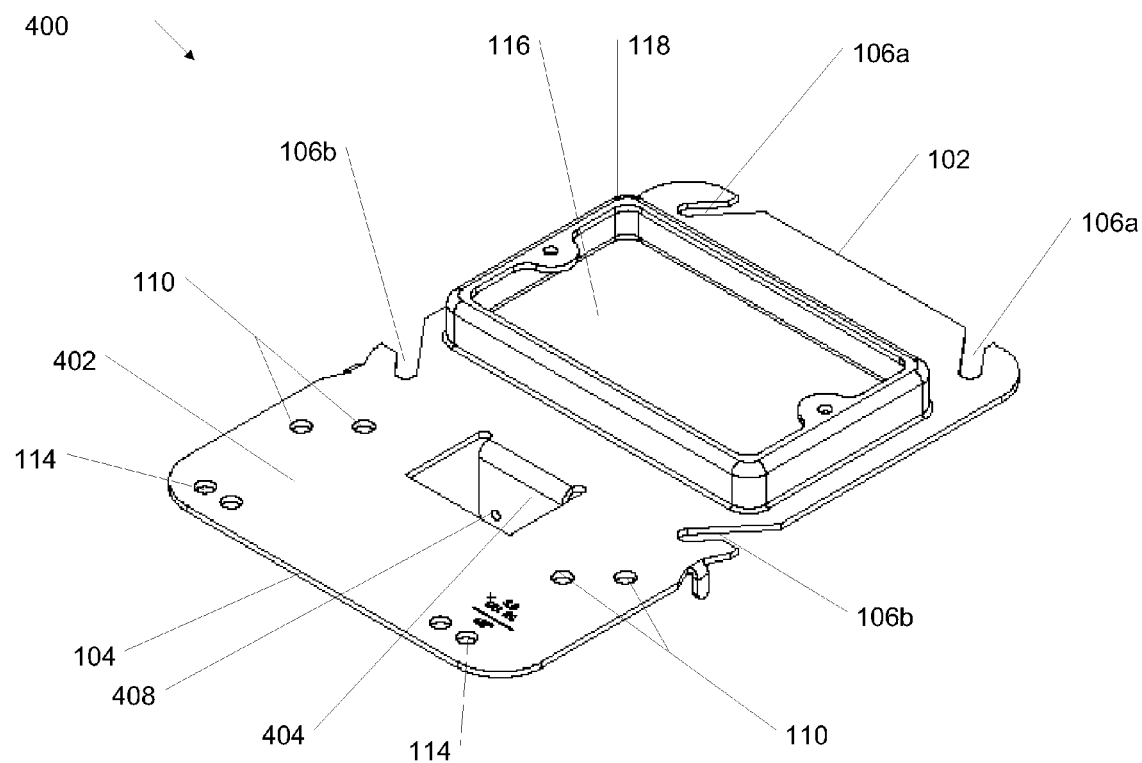
FIG. 4A is a perspective view of a combination mounting plate and cover assembly according to an alternative exemplary embodiment.
Figure 4B:
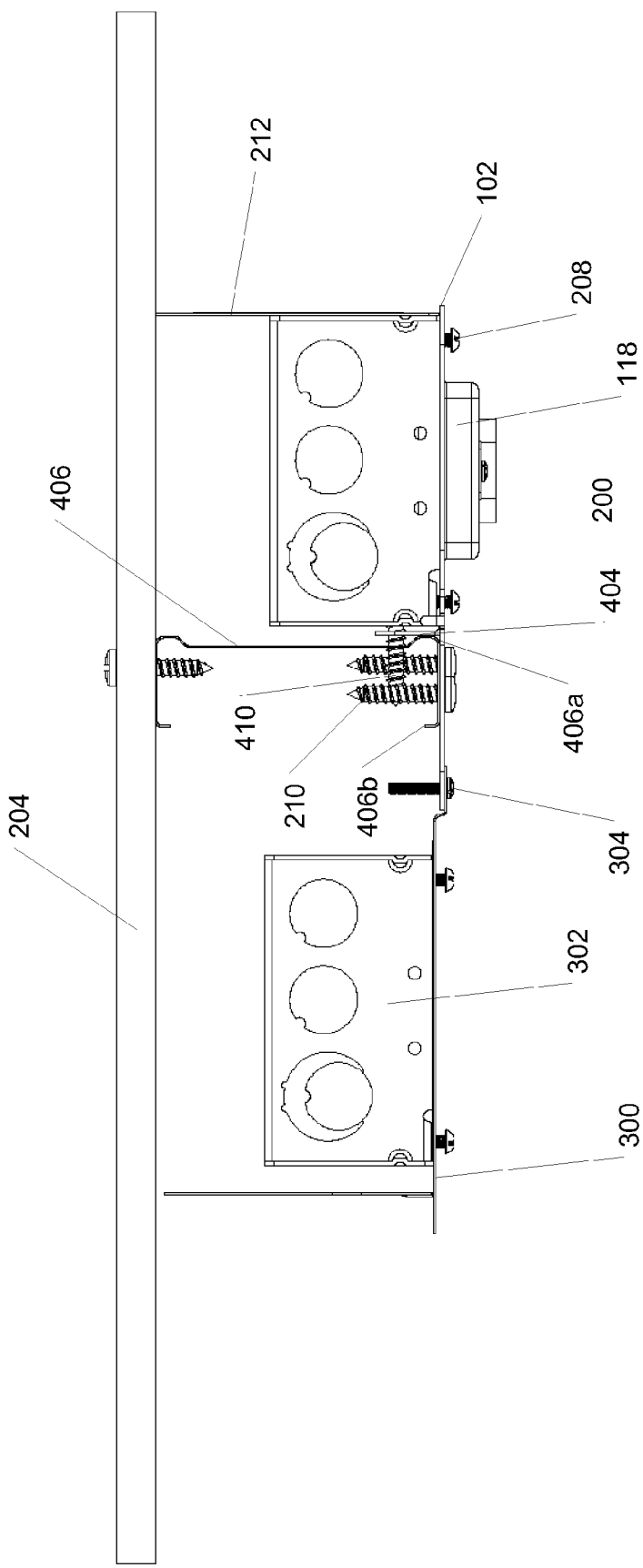
FIG. 4B is a side cross-sectional view of the combination mounting plate and cover assembly shown in FIG. 4A having an electrical outlet box connected thereto according to an exemplary embodiment.

Referring to FIGS. 4A-4B, another exemplary combination mounting plate and cover assembly 400 is illustrated as a single unitary member. Assembly 400 is similar to assembly 100 with the difference being in the planar portion. Planar portion 402 comprises a leg 404 that extends orthogonal to and outwardly therefrom towards wall 204. In an exemplary embodiment, leg 404 may be formed by cutting three sides of a rectangular portion of planar portion 402 and bending the cut portion away from assembly 400 along the uncut side of the rectangular portion. In an alternative exemplary embodiment, leg 404 may be formed integrally with the assembly 400 during a molding process.

When assembly 400 is mounted to a stud 406, leg 404 may solidly abut a side wall 406a of stud 406 and thus substantially limit any horizontal or angular movement of assembly 400 with respect to stud 406. Furthermore, any deflectional movement of assembly 400 with respect to stud 406 may be limited. While leg 404 is shown to be rectangular, one of ordinary skill in the art will recognize that leg 404 may be any other suitable shape, provided leg 404 can contact at least a portion of side wall 406a of stud 406. In certain exemplary embodiments, leg 404 may include apertures 408 through which fasteners 410 may be received to further secure assembly 400 to stud 406. Similar to assembly 100, a bracket 300 and electrical outlet box 302 may be attached via fasteners 304 through apertures 114 of assembly 400 to mount bracket 300 and electrical outlet box 302 on an opposite side 406b of stud 406.

Thus, assemblies 100, 400 have the combined function of a box support, raised cover ring, and secondary bracket and/or outlet box mount, thereby providing cost efficiency by reducing the number of parts and the labor time to assemble and install as compared to conventional assemblies.

Generally, methods of the present invention include methods of mounting an electrical outlet box on one side of a stud on a wall of a building structure using a combination mounting plate and cover assembly, as well as mounting a bracket and/or second outlet box to the combination assembly on the opposite side of the stud. The user can secure an electrical outlet box to the combination assembly and adjacent a stud, secure the combination assembly to the stud with the electrical outlet box disposed on one side of the stud, and secure a bracket and/or second outlet box to the combination assembly on the opposite side of the stud. One having ordinary skill in the art will realize that the user may complete these steps in any order.

Therefore, the present invention is well adapted to attain the ends and advantages mentioned as well as those that are inherent therein. The particular embodiments disclosed above are illustrative only, as the present invention may be modified and practiced in different but equivalent manners apparent to those having ordinary skill in the art having the benefit of the teachings herein. Having described some exemplary embodiments of the present invention, it is believed that the combination mounting plate and cover assemblies may be formed in a variety of sizes having any desired size of open portion to permit the use of more than one fixture within the electrical outlet box. The use of ganged fixtures also is possible. While numerous changes may be made by those having ordinary skill in the art, such changes are encompassed within the spirit and scope of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention as defined by the claims below. The terms in the claims have their plain, ordinary meaning unless otherwise explicitly and clearly defined by the patentee.

What is claimed is:

1. An electrical box support, comprising:
   an open portion comprising a first opening, wherein the first opening is configured to receive an opening of an electrical box; and
   a planar portion adjacent to the open portion, wherein the planar portion comprises:
      a first end disposed adjacent to the open portion, wherein the first end comprises a plurality of holes configured to receive a plurality of anchoring fasteners that couple to a stud; and
      a second end disposed adjacent to the first end, wherein the second end comprises a plurality of apertures configured to receive a plurality of coupling fasteners that couple to a side of another electrical box,
      wherein the open portion and the second end are parallel to each other and extend on opposite sides of the stud,
      wherein the second end lacks a second opening configured to receive an opening of the another electrical box, and
      wherein the plurality of apertures comprises a first aperture that is horizontally offset from a second aperture of the plurality of apertures.

2. The support of claim 1, further comprising a plurality of apertures disposed around the open portion, wherein the plurality of apertures is configured to align with a mounting portion of the electrical box.

3. The support of claim 2, wherein each of the plurality of apertures is slotted.

4. The support of claim 1, further comprising a raised rib disposed about a circumference of the opening.

5. The support of claim 4, wherein the raised rib is formed integrally with the circumference of the opening.

6. The support of claim 1, wherein the plurality of apertures in the second end of the planar portion are proximate to an outer edge of the second end.

7. The support of claim 1, wherein the another electrical unit comprises a plurality of connecting points along the side that correspond to the plurality of apertures in the second end of the planar portion, wherein the plurality of connecting points are configured to receive the plurality of coupling fasteners, and wherein the side of the another electrical unit is different than the opening of the another electrical unit.

8. The support of claim 1, further comprising:
   a bracket attached to the plurality of apertures in the second end of the planar portion.

9. The support of claim 1, further comprising:
   a support portion extending substantially orthogonal from an outer edge of the open portion.

10. The support of claim 1, wherein the planar portion further comprises a leg extending from and orthogonal to an area between the first end and the second end, wherein the leg is configured to align with a first stud side of the stud.

11. The electrical box support of claim 10, wherein the side of the electrical box contacts a second stud side of the stud when the electrical box is received in the first opening of the open portion, wherein the second stud side is adjacent to a stud face of the stud, wherein the stud face couples to the first end of the planar portion using the plurality of anchoring fasteners.

12. The support of claim 1, wherein the planar portion further comprises a viewing window.

13. The electrical box support of claim 1, wherein the plurality of holes comprises a first hole that is vertically offset from a second hole of the plurality of holes.

14. The electrical box support of claim 13, wherein the first hole is horizontally offset from the second hole of the plurality of holes.

15. The electrical box support of claim 14, wherein the first hole is horizontally offset from the first aperture and the second aperture of the plurality of apertures.

16. A system, comprising:
a stud;
an electrical outlet box;
a member comprising:
- a first portion disposed within a vertical plane and extending to a first side of the stud, wherein the first portion lacks an opening configured to receive a front portion of the electrical outlet box, and wherein the first portion comprises a plurality of apertures;
- a second portion disposed adjacent to the first portion within the vertical plane and coupled to the stud; and
- a third portion disposed adjacent to the second portion within the vertical plane and extending to a second side of the stud opposite the first side of the stud wherein the third portion comprises the opening configured to receive the front portion of the electrical outlet box; and an electrical unit coupled to the first portion of the member using a plurality of coupling fasteners that traverse the plurality of apertures in the first portion and couple to a side of the electrical unit, wherein the plurality of apertures comprises a first aperture that is horizontally offset from a second aperture of the plurality of apertures.

17. The system of claim 16, wherein the electrical outlet box abuts against a side of the stud to which the member is attached when the electrical outlet box is received by the opening.

18. The system of claim 16, wherein said electrical unit comprises at least one selected from a group consisting of a bracket, an additional electrical outlet box, and an additional member.

19. The system of claim 18, wherein the additional member comprises an opening for an additional electrical outlet box.

20. The system of claim 16, wherein the plurality of apertures is slotted.

21. The system of claim 16, wherein the third portion of the member further comprises a raised rib disposed about a circumference of the opening.

22. The system of claim 16, wherein the member further comprises a support extending at least partially orthogonal to the third portion of the member.

23. The system of claim 22, wherein the support is formed integrally with the member.

24. The system of claim 22, wherein the support extends from an end of the third portion of the member.

25. The system of claim 16, wherein the member further comprises a leg extending from and at least partially orthogonal to the second portion of the member, wherein the leg is positioned adjacent to a side of the stud.

26. The system of claim 16, wherein the second portion is coupled to the stud by a plurality of fastening devices that traverse a plurality of holes in the second portion, wherein the plurality of holes comprises a first hole that is vertically offset from a second hole of the plurality of holes.

27. The system of claim 26, wherein the first hole is horizontally offset from the second hole of the plurality of holes.

28. The system of claim 27, wherein the first hole is horizontally offset from the first aperture and the second aperture of the plurality of apertures.

* * * * *